US012754563B2

(12) United States Patent
Leong et al.

(10) Patent No.: US 12,754,563 B2
(45) Date of Patent: Oct. 6, 2026

(54) METHOD AND SYSTEM FOR NAVIGATING A ROBOT

(71) Applicant: Agency for Science, Technology and Research, Singapore (SG)

(72) Inventors: Jiacheng Andrew Leong, Singapore (SG); Albertus Hendrawan Adiwahono, Singapore (SG); Yangwei You, Singapore (SG); Meng Yee Chuah, Singapore (SG); Tai Pang Chen, Singapore (SG); Jian Le Chan, Singapore (SG); Chee Leong Raymond Chan, Singapore (SG); Kam Pheng Ng, Singapore (SG); Kong Wah Wan, Singapore (SG); Wei Yun Yau, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 22 days.

(21) Appl. No.: 18/852,031

(22) PCT Filed: Mar. 30, 2023

(86) PCT No.: PCT/SG2023/050213
§ 371 (c)(1),
(2) Date: Sep. 27, 2024

(87) PCT Pub. No.: WO2023/191723
PCT Pub. Date: Oct. 5, 2023

(65) Prior Publication Data

US 2025/0199542 A1 Jun. 19, 2025

(30) Foreign Application Priority Data

Mar. 30, 2022 (SG) .......................... 10202203237Y

(51) Int. Cl.
*G05D 1/644* (2024.01)
*G05D 1/633* (2024.01)
(Continued)

(52) U.S. Cl.
CPC ............ *G05D 1/644* (2024.01); *G05D 1/633* (2024.01); *G06V 10/26* (2022.01); *G06V 20/56* (2022.01)

(58) Field of Classification Search
CPC ........ G05D 1/644; G05D 1/633; G06V 10/26; G06V 20/56
(Continued)

(56) References Cited

U.S. PATENT DOCUMENTS 9,081,079 B2 * 7/2015 Chao .................. G01S 5/02522
9,452,530 B2 * 9/2016 Sisbot .................... G06V 40/25
(Continued)

FOREIGN PATENT DOCUMENTS

CN 112947415 6/2021
CN 113741438 12/2021

OTHER PUBLICATIONS

The International Search Report (ISR) with Written Opinion for PCT/SG2023/050213 dated Aug. 28, 2023, pp. 1-9.
(Continued)

*Primary Examiner* — Luis A Martinez Borrero
(74) *Attorney, Agent, or Firm* — McDonnell Boehnen Hulbert & Berghoff LLP

(57) ABSTRACT

A method and system for navigating a robot 100 are provided herein. In an embodiment, the method comprises: detecting on-site reference features of the robot's location when the robot is traversing in an environment; identifying objects of interest 180 from the detected on-site reference features; deriving a semantic data for each object of interest 180 from the on-site reference features; generating a seman-
(Continued)

tic cost map 166 based on the semantic data of the objects of interest 180, the semantic cost map 166 representing cost of traversing in the environment; and navigating the robot 100 based on the semantic cost map 166.

17 Claims, 8 Drawing Sheets

(51) Int. Cl.
*G06V 10/26* (2022.01)
*G06V 20/56* (2022.01)

(58) Field of Classification Search
USPC .......................................................... 701/25
See application file for complete search history.

(56) References Cited

U.S. PATENT DOCUMENTS 9,594,377 B1* 3/2017 Perkins .................. B25J 9/1664
9,612,123 B1* 4/2017 Levinson ............... B60Q 1/508
10,612,934 B2* 4/2020 Tan .................... G01C 21/3453
11,179,850 B2* 11/2021 Dupuis ................ G05D 1/0291
11,232,391 B1* 1/2022 Baalke ............... G01C 21/3688
11,372,409 B2* 6/2022 Freitas ................ B62D 57/032
11,676,296 B2* 6/2023 Chiu ...................... G06T 7/579 345/633
12,248,881 B2* 3/2025 Yang ...................... G06N 20/00
2011/0288684 A1* 11/2011 Farlow .................. B25J 19/023 901/1
2013/0295952 A1* 11/2013 Chao ..................... G01S 5/0236 455/456.1
2016/0114488 A1* 4/2016 Mascorro Medina ....................... B25J 9/1697 901/1
2017/0123421 A1* 5/2017 Kentley ............. G01C 21/3415
2019/0176333 A1* 6/2019 Hager, IV .......... G01C 21/3833
2019/0219409 A1* 7/2019 Tan .................... G01C 21/3453
2019/0271554 A1* 9/2019 Colgate .............. G01C 21/3841
2019/0377346 A1* 12/2019 Freitas ................. B62D 57/028
2020/0047340 A1* 2/2020 Hong .................... G01S 17/894
2020/0050995 A1* 2/2020 Ramanand ....... G06Q 10/06395
2020/0338733 A1* 10/2020 Dupuis ................ G05D 1/6987
2021/0004613 A1* 1/2021 Yang ...................... G06V 20/56
2021/0201070 A1* 7/2021 Omari ................ G01C 21/3635
2021/0281977 A1* 9/2021 Ebner ..................... H04W 4/33
2021/0331315 A1* 10/2021 Park ....................... B25J 9/1676
2023/0237813 A1* 7/2023 Corte ................... G06V 10/225 382/103
2024/0028031 A1* 1/2024 Kentley-Klay .... G01C 21/3415
2024/0310851 A1* 9/2024 Ebrahimi Afrouzi ... G01S 17/87
2025/0216856 A1* 7/2025 Li ........................ G01C 21/383

OTHER PUBLICATIONS

Zhao C. et al. "Building a grid-semantic map for the navigation of service robots through human-robot interaction" Digital Communications and Networks (2015) vol. 1, pp. 253-266. [Retrieved on Aug. 25, 2023] <DOI: 10.1016/J.DCAN.2015.09.002>.
Sun H. et al. "Semantic Mapping and Semantics-boosted Navigation with Path Creation on a Mobile Robot". 2017 IEEE 8th International Conference on CIS & RAM (2018), pp. 207-212. [Retrieved on Aug. 25, 2023] <DOI: 10.1109/ICCIS.2017.8274775>.

* cited by examiner

METHOD AND SYSTEM FOR NAVIGATING A ROBOT

This application is a U.S. national phase of International Application No. PCT/SG2023/050213, filed on Mar. 30, 2023, which claims priority to Singapore Patent Application 10202203237Y, filed Mar. 30, 2022, both of which are incorporated by reference herein in their entirety.

FIELD

The invention relates to a method and system for navigating a robot, particularly but not exclusively, in crowded and dynamic environments.

BACKGROUND

Navigating a robot in a human-dense environments could be a challenging task. Due to the possibility of dynamic changes to locations and speed of each person, robots usually "freeze" as the human prediction is too noisy or unreliable, resulting in an unnatural movement of the robots. Some robots address such issues by navigating the robot to stop or reverse and retry its route again. Therefore, such robots could have difficulty adapting to dynamic situations and could not meet the high expectation of co-sharing its operation space in crowded environments such as hospitals and airports. This limits the application of robots.

It is an object of the present invention to address problems of the prior art and/or to provide the public with a useful choice.

SUMMARY

According to a first aspect of the present invention, there is provided a method of navigating a robot, the method comprises: detecting on-site reference features of the robot's location when the robot is traversing in an environment; identifying objects of interest from the detected on-site reference features; deriving a semantic data for each object of interest from the on-site reference features; generating a semantic cost map based on the semantic data of the objects of interest, the semantic cost map representing cost of traversing in the environment; and navigating the robot based on the semantic cost map.

As described in the preferred embodiment, by detecting objects of interest and deriving semantic data for corresponding objects of interest, the semantic cost map generated based on such semantic data may comprise different costs for different groups of objects of interest, which may help to improve the efficiency of path planning and therefore improve the navigation, particularly when the robot is in a crowded environment. The method may enable the robot to adapt to dynamic situations, which may provide a basis for the robot to operate in difficult scenarios to realize a compliance navigation with an adaptive/dynamic spectrum of robot behaviour based on circumstances and space available.

In an embodiment, navigating the robot based on the semantic cost map may comprise deriving a velocity command from the semantic cost map for controlling the robot.

In an embodiment, detecting the on-site reference features may comprise detecting a tactile force being applied to the robot. Detecting tactile force may provide the robot social clues for natural human-robot interaction, which may enable the robot to engage with human subjects in its near vicinity both passively and actively. This may also allow the robot to prioritise the objects of interest with higher importance, and may allow the robot to move about dynamic crowded scenes with predictive, social, and context awareness of its environment.

In an embodiment, the semantic data for each object of interest may be derived from at least one of a predefined importance value of a type of a corresponding object of interest, a position of the corresponding object of interest, an orientation of the corresponding object of interest with respect to the robot, and a classification of the corresponding object of interest.

In an embodiment, the method may further comprise analysing at least one of a priority level of a mission of the robot, a navigation route compliance value in the environment, and a condition of the environment, for generating the semantic cost map. Analysis of these factors may help to generate a navigation plan that is adaptive to the robot's task and the dynamic environment. For example, the analysis of mission priority may help to dynamically adjust the robot's patience which decreases over time, which then allows the robot to attempt to "squeeze" through these objects of interest.

In an embodiment, identifying the objects of interest may comprise identifying a motion status of each identified object of interest. If any of the objects of interest is identified to be moving, deriving the semantic data for such moving object of interest may comprise predicting a trajectory of such moving object of interest. By predicting the trajectory of the moving object of interest, the generated navigation plan may help the robot to proceed with a path at low risk of collision in advance so that the efficiency and safety may be improved.

In an embodiment, detecting the on-site reference features at the robot's location may comprise obtaining a vision data at the robot's location. The vision data may be used for performing a semantic segmentation for deriving the semantic data for each object of interest.

In an embodiment, detecting the on-site reference features may comprise detecting a tactile force being applied to the robot; and navigating the robot based on the semantic cost map may comprise deriving a velocity command from the semantic cost map for controlling the robot; the method may further comprise adjusting the velocity command in response to the detection of the tactile force being applied to the robot. Adjusting the velocity command in response to the detected tactile force may help the robot to react properly to the dynamic environment, in particular when in crowd; e.g. when the robot is in a crowded area, the adjustment of velocity command may help the robot to come out of the crowd at a low speed through a narrow channel.

According to a second aspect of the present invention, there is provided a system for navigating a robot. The system comprises a sensor module configured to detect on-site reference features, and a processor; the processor is configured to receive on-site reference features detected at the robot's location when the robot is traversing in an environment; identify objects of interest from the on-site reference features; derive a semantic data for each object of interest from the on-site reference features; generate a semantic cost map based on the semantic data of the objects of interest, the semantic cost map representing cost of traversing in the environment; and navigate the robot based on the semantic cost map.

By detecting objects of interest and deriving semantic data for corresponding objects of interest, the processor of the system may generate the semantic cost map based on such semantic data to comprise different costs for different groups of objects of interest, which may help to improve the efficiency of path planning and therefore improve the navigation, particularly when the robot is in a crowded environment. The system may enable the robot to adapt to dynamic situations, which may provide a basis for the robot to operate in difficult scenarios to realize a compliance navigation with an adaptive/dynamic spectrum of robot behaviour based on circumstances and space available.

In an embodiment, the processor may be further configured to derive a velocity command from the semantic cost map for navigating the robot.

In an embodiment, the on-site reference features may comprise a tactile force being applied to the robot. By detecting tactile force, the system may provide the robot social clues for natural human-robot interaction, which may enable the robot to engage with human subjects in its near vicinity both passively and actively. With such system, the robot may prioritise the objects of interest with higher importance, and move about dynamic crowded scenes with predictive, social, and context awareness of its environment.

In an embodiment, the semantic data for each object of interest may be derived from at least one of a predefined importance value of a type of the corresponding object of interest, a position of the corresponding object of interest, an orientation of the corresponding object of interest with respect to the robot, and a classification of the corresponding object of interest.

In an embodiment, the processor may be further configured to analyse at least one of a priority level of a mission of the robot, a condition of the environment, and a navigation route compliance value in the environment, for generating the semantic cost map. Configuring the system to analyse these factors may help to generate a navigation plan that is adaptive to the robot's task and the dynamic environment. For example, the analysis of mission priority may help to dynamically adjust the robot's patience which decreases over time, which then allows the robot to attempt to "squeeze" through these objects of interest.

In an embodiment, the processor may be further configured to identify a motion status of each identified object of interest. The processor may be further configured to predict a trajectory of the object of interest that is identified to be in motion.

In an embodiment, the on-site reference features of the robot's location may comprise a vision data at the robot's location. The processor may be further configured to perform a semantic segmentation on the vision data for deriving the semantic data.

In an embodiment, the processor may be further configured to detect a tactile force being applied to the robot, derive a velocity command from the semantic cost map for navigating the robot, and adjust the velocity command in response to the detection of the tactile force being applied to the robot. Configuring the system to adjust the velocity command in response to the detected tactile force may help the robot to react properly to the dynamic environment, in particular when in crowd; e.g. when the robot is in a crowded area, the adjustment of velocity command may help the robot to come out of the crowd at a low speed through a narrow channel.

According to a third aspect of the present invention, there is provided a robot; the robot comprises a system and a controller configured to control an operation of the robot based on a navigation data provided by the system; the system comprises a sensor module configured to detect on-site reference features, and a processor; the processor is configured to receive on-site reference features detected at the robot's location when the robot is traversing in an environment; identify objects of interest from the on-site reference features; derive a semantic data for each object of interest from the on-site reference features; generate a semantic cost map based on the semantic data of the objects of interest, the semantic cost map representing cost of traversing in the environment; and navigate the robot based on the semantic cost map.

According to a third aspect of the present invention, there is provided a non-transitory computer-readable storage medium for storing a computer program, when executed by a processor, performs a method for navigating a robot; the method comprises: detecting on-site reference features of the robot's location when the robot is traversing in an environment; identifying objects of interest from the detected on-site reference features; deriving a semantic data for each object of interest from the on-site reference features; generating a semantic cost map based on the semantic data of the objects of interest, the semantic cost map representing cost of traversing in the environment; and navigating the robot based on the semantic cost map.

BRIEF DESCRIPTION OF THE DRAWINGS

In the following, an embodiment of the present invention including the figures will be described as non-limiting examples with reference to the accompanying drawings in which:

FIG. 6(*b*) illustrates a semantic cost map generated for FIG. 6(*a*) using the method of FIG. 3;

DETAILED DESCRIPTION

According to an embodiment of the present invention, a method of navigating a robot and a system for performing the method are provided. As will be described in detail below, the system navigates the robot in an environment, even when the environment is crowded. When the robot is traversing in the environment, a sensor module, which is a multi-modal proprioception input module for receiving sensed data from an array of force or pressure sensors, 2D Lidar sensors, 3D Lidar sensors, cameras and depth sensors, detects on-site reference features, from which objects of interest are then identified. With the identified objects of interest, a semantic module derives semantic data for each object of interest. An influence module analyses relevant situational data, such as situational data relating to a mission of the robot and the environment where the robot is traversing, and generates an influence factor. Based on the semantic data and the influence factor, a cost map module generates a semantic cost map representing cost of traversing in the environment for navigating the robot. A path planning module plans path for navigating the robot in the environment based on the semantic cost map. A compliance controller controls operation of the robot based on the data from the sensor module, the semantic module, the influence module, the cost map module and the path planning module, including adjusting velocity command for the robot.

Figure 1:
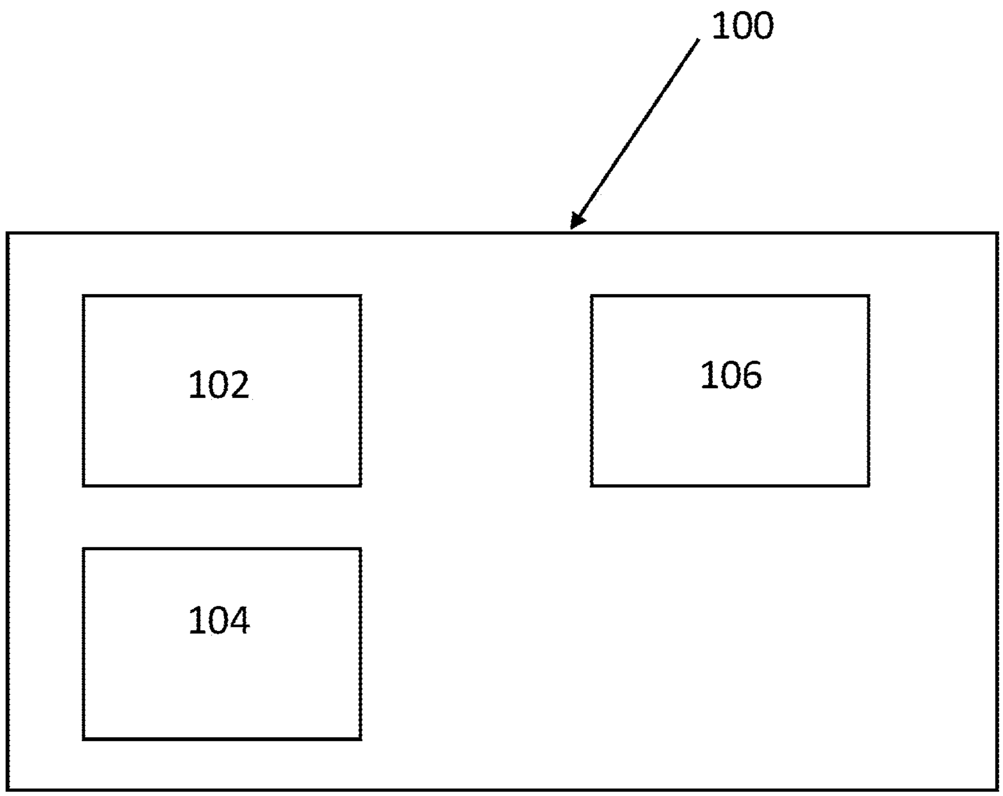
FIG. 1 is a simplified functional block diagram of a robot according to an embodiment of the present invention comprising a navigation system.

FIG. 1 depicts a simplified functional block diagram of the robot 100 according to the described embodiment. The sensor module 102 of the robot 100 comprises a plurality of sensors for detecting information of an environment where the robot 100 locates (such as tactile sensors 140 (see FIG. 4), 2D Lidar sensors 142, 3D Lidar sensors 144, RGB sensors 148 and RGB-D sensors 146), a navigation system 104 configured to provide information for navigating the robot 100 comprising the semantic module 122 (see FIG. 2), the influence module 124, the cost map module 126 and the path planning module 128, and a controller 106 configured to control an operation of the robot 100 taking into account of the information provided by the sensor module 102 and the navigation system 104.

The controller 106 may comprise computing devices and a plurality of sub-systems (not shown) for controlling specific aspects of movement of the robot 100 including but not limited to a deceleration system, an acceleration system and a steering system. Certain of these sub-systems may comprise one or more actuators, for example the deceleration system may comprise brakes, the acceleration system may comprise an accelerator pedal, and the steering system may comprise a steering wheel or other actuator to control the angle of turn of wheels of the robot 100, etc.

Figure 2:
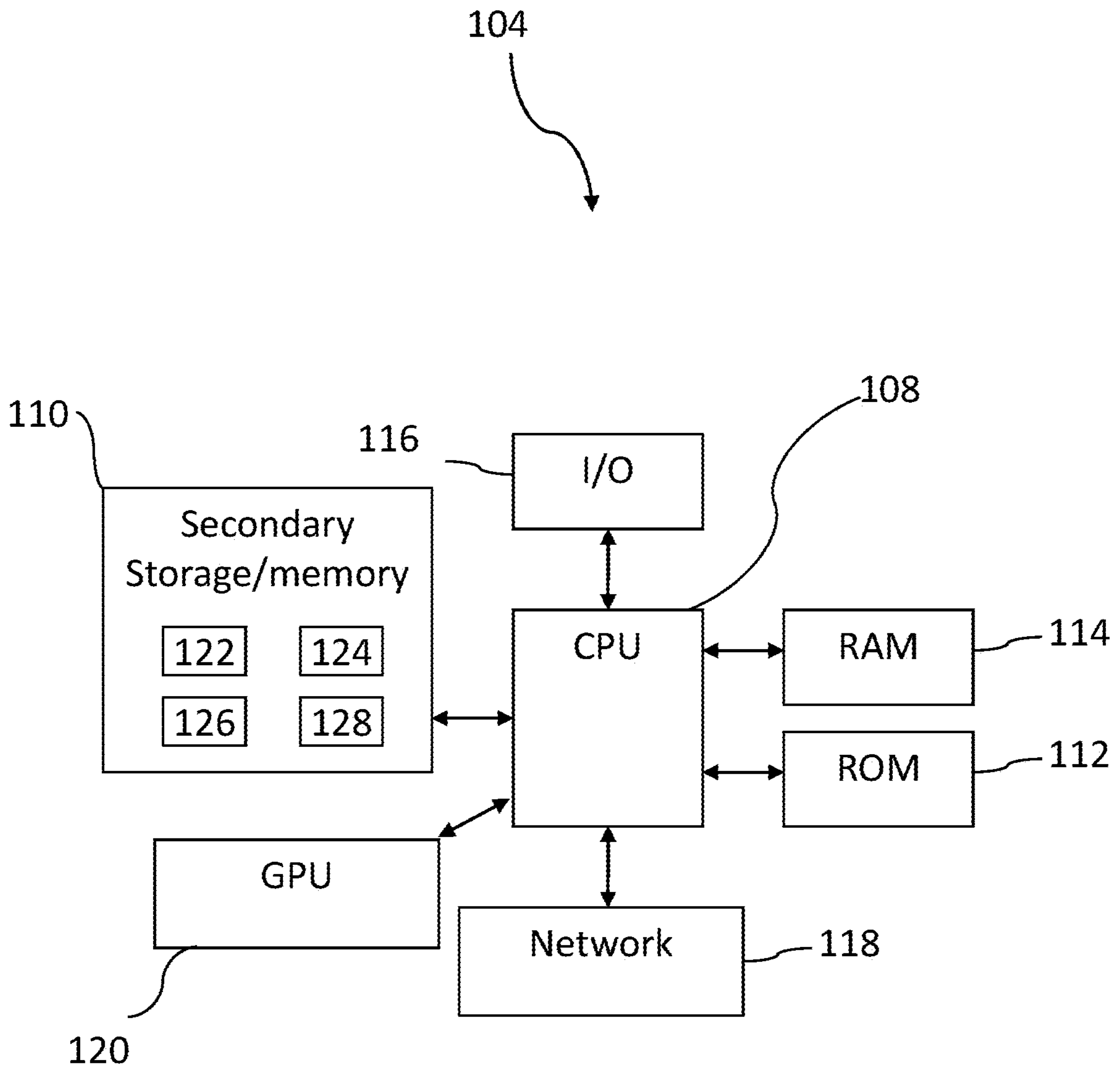
FIG. 2 illustrates a block diagram of the navigation system of FIG. 1.

FIG. 2 illustrates the block diagram of the navigation system 104. The navigation system 104 includes a processor 108 (which may be referred to as a central processor unit or CPU) that is in communication with memory devices including a secondary storage 110, a read only memory (ROM) 112, a random access memory (RAM) 114, an input/output (I/O) devices 116, a network connectivity devices 118 and a graphics processing unit (GPU) 120, for example a mini GPU. The processor 108 and/or GPU 120 may be implemented as one or more CPU chips. The GPU 120 may be embedded alongside the processor 108 or it may be a discrete unit, as shown in FIG. 2.

It is understood that by programming and/or loading executable instructions onto the navigation system 104, at least one of the CPU 108, the RAM 114, the ROM 112 and the GPU 120 are changed, transforming the navigation system 104 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the navigation system 104 is turned on or booted, the CPU 108 and/or GPU 120 may execute a computer program or application. For example, the CPU 108 and/or GPU 120 may execute software or firmware stored in the ROM 112 or stored in the RAM 114. In some cases, on boot and/or when the application is initiated, the CPU 108 and/or GPU 120 may copy the application or portions of the application from the secondary storage 110 to the RAM 114 or to memory space within the CPU 108 and/or GPU 120 itself, and the CPU 108 and/or GPU 120 may then execute instructions that the application is comprised of. In some cases, the CPU 108 and/or GPU 120 may copy the application or portions of the application from memory accessed via the network connectivity devices 118 or via the I/O devices 116 to the RAM 114 or to memory space within the CPU 108 and/or GPU 120, and the CPU 108 and/or GPU 120 may then execute instructions that the application is comprised of. During execution, an application may load instructions into the CPU 108 and/or GPU 120, for example load some of the instructions of the application into a cache of the CPU 108 and/or GPU 120. In some contexts, an application that is executed may be said to configure the CPU 108 and/or GPU 120 to do something, e.g., to configure the CPU 108 and/or GPU 120 to perform the navigation according to the described embodiment. When the CPU 108 and/or GPU 120 is configured in this way by the application, the CPU 108 and/or GPU 120 becomes a specific purpose computer or a specific purpose machine.

The secondary storage 110 may comprise one or more disk drives or tape drives and is used for non-volatile storage of data and as an over-flow data storage device if the RAM 114 is not large enough to hold all working data. The secondary storage 110 may be used to store programs which are loaded into the RAM 114 when such programs are selected for execution, such as the semantic module 122, the influence module 124, the cost map module 126 and the path planning module 128. The ROM 112 is used to store instructions and perhaps data which are read during program execution. The ROM 112 is a non-volatile memory device which typically has a small memory capacity relative to the larger memory capacity of the secondary storage 110. The RAM 114 is used to store volatile data and perhaps to store instructions. Access to both the ROM 112 and the RAM 114 is typically faster than to the secondary storage 110. The secondary storage 110, the RAM 114, and/or the ROM 112 may be referred to in some contexts as computer readable storage media and/or non-transitory computer readable media.

The I/O devices 116 may include a wireless or wired connection to the sensor module 102 for receiving data from the sensor module 102 and/or a wireless or wired connection to the controller 106 for transmitting information, such as a path plan, so that the controller 106 may control operation of the robot 100 accordingly. The I/O devices 116 may alternatively or additionally include electronic displays such as video monitors, liquid crystal displays (LCDs), plasma displays, touch screen displays, or other well-known output devices.

The network connectivity devices 118 may enable a wireless connection to facilitate communication with other computing devices such as components of the robot 100, for example the sensor module 102 and/or controller 106 or with other computing devices not part of the robot 100. The network connectivity devices 118 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. The network connectivity devices 118 may enable the processor 108 and/or GPU 120 to communicate with the Internet or one or more intranets. With such a network connection, it is contemplated that the processor 108 and/or GPU 120 might receive information from the network, or might output information to the network in the course of performing a navigation method according to the described embodiment. Such information, which is often represented as a sequence of instructions to be executed using the processor 108 and/or GPU 120, may be received from and outputted to the network, for example, in the form of a computer data signal embodied in a carrier wave.

Such information, which may include data or instructions to be executed using the processor 108 and/or GPU 120 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 108 and/or GPU 120 executes instructions, codes, computer programs, scripts which it accesses from hard disk, floppy disk, optical disk (these various disk-based systems may all be considered the secondary storage 110), flash drive, the ROM 112, the RAM 114, or the network connectivity devices 118. While only one processor 108 and GPU 120 are shown, multiple processors may be present. Thus, while instructions may be discussed as executed by one processor 108, the instructions may be executed simultaneously, serially, or otherwise executed by one or multiple processors. Instructions, codes, computer programs, scripts, and/or data that may be accessed from the secondary storage 110, for example, hard drives, floppy disks, optical disks, and/or other device, the ROM 112, and/or the RAM 114 may be referred to in some contexts as non-transitory instructions and/or non-transitory information.

In an embodiment, the navigation system 104 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the navigation system 104 to provide the functionality of a number of servers that is not directly bound to the number of computers in the navigation system 104. For example, virtualization software may provide twenty virtual servers on four physical computers. In an embodiment, the functionality according to the described embodiment may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality of the described embodiment may be provided as a computer program product. The computer program product may comprise one or more computer readable storage medium having computer usable program code embodied therein to implement the functionality according to the described embodiment. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analogue magnetic tape, compact disk read only memory (CD-ROM) disks, floppy disks, jump drives, digital cards, multimedia cards, and others. The computer program product may be suitable for loading, by the navigation system 104, at least portions of the contents of the computer program product to the secondary storage 110, to the ROM 112, to the RAM 114, and/or to other non-volatile memory and volatile memory of the navigation system 104. The processor 108 and/or GPU 120 may process the executable instructions and/or data structures in part by directly accessing the computer program product, for example by reading from a CD-ROM disk inserted into a disk drive peripheral of the navigation system 104. Alternatively, the processor 108 and/or GPU 120 may process the executable instructions and/or data structures by remotely accessing the computer program product, for example by downloading the executable instructions and/or data structures from a remote server through the network connectivity devices 118. The computer program product may comprise instructions that promote the loading and/or copying of data, data structures, files, and/or executable instructions to the secondary storage 110, to the ROM 112, to the RAM 114, and/or to other non-volatile memory and volatile memory of the navigation system 104.

In some contexts, the secondary storage 110, the ROM 112, and the RAM 114 may be referred to as a non-transitory computer readable medium or a computer readable storage media. A dynamic RAM embodiment of the RAM 114, likewise, may be referred to as a non-transitory computer readable medium in that while the dynamic RAM receives electrical power and is operated in accordance with its design, for example during a period of time during which the navigation system 104 is turned on and operational, the dynamic RAM stores information that is written to it.

Similarly, the processor 108 and/or GPU 120 may comprise an internal RAM, an internal ROM, a cache memory, and/or other internal non-transitory storage blocks, sections, or components that may be referred to in some contexts as non-transitory computer readable media or computer readable storage media.

Subject to requirement of computation in actual application, an Accelerating Unit (AU) may be used to accelerate computation. The AU may use the GPU 120 or additional modules, whether hardware or software, local or remote, to accelerate the computation. Hardware accelerators may be selected from a group of hardware tools, including Intel® Movidius™ VPU, Intel® Iris® Xe Graphics, Google Coral™, etc. An additional hardware module may be connected to the CPU 108 via communication bus (e.g. USB, PCIe or Ethernet). This AU may have its own memory, processing unit and dedicated hardware to perform work-sharing to accelerate the computation of certain processes assigned by the main CPU 108. Separately, as a software AU, if cloud computing with fast network access is available, the cloud may be used as an AU to accelerate the processes.

Figure 3:
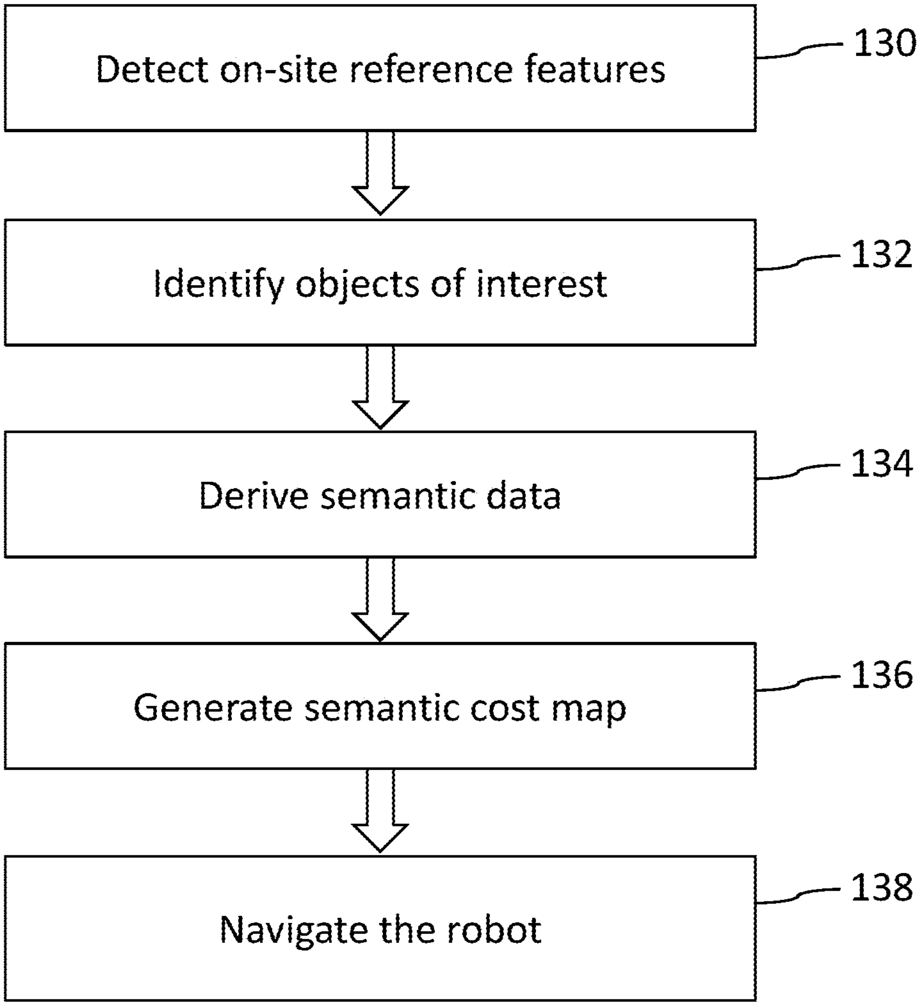
FIG. 3 illustrates a navigation method performed by the navigation system of FIG. 1.

FIG. 3 illustrates an exemplary method of navigating the robot 100 performed by the navigation system 104. The navigation method is executed by the processor 108 and/or GPU 120 of the navigation system 104. The method, comprising steps 130 to 138, is performed in real time when the robot 100 is in motion to support navigation and control of the robot 100.

At step 130, the sensor module 102 of the robot 100 is operable to detect on-site reference features. When the robot 100 is traversing in an environment, objects (including human subjects) surrounding the robot 100 change over time. Shape, location, motion status of the objects, and distance between the robot 100 and the objects may be used by the robot 100 in navigation and would be collectively called reference features. The sensor module 102 is a multi-modal proprioception input module comprising a plurality of sensors arranged to detect various types of on-site reference features and in this embodiment, the plurality of sensors includes the tactile sensors 140, the 2D LiDAR sensors 142, the 3D LiDAR sensors 144, the depth (RGB-D) sensors 146, and the RGB sensors 148, see FIG. 4. The sensors (140, 142, 144, 146, 148) are mounted to the robot's body in strategic locations capable of sensing objects approaching the robot 100 from any direction. FIG. 5 illustrates six tactile sensors 140 that are placed all around the robot 100 in order to sense incoming force or touch from a person from different directions 174, indicating that the person is asking for a way. With the tactile sensors 140, a collision occurred to the robot 100 is detected and the information is sent to the compliance controller 170. The tactile sensors 140 enable the robot 100 to detect obstacles in near vicinity which possibly lie in the blind spot of laser sensors or cameras in order to respond accordingly. With the multiple types of sensors being used, the detected on-site reference features are presented in various forms, such as a force value, a point cloud, an image, a depth data, etc.

At step 132, the controller 108 of the navigation system is operable to identify the objects of interest 180 (see FIG. 8) from the detected on-site reference features. The objects of interest 180 are detected using known technology, such as using image segmentation to detect objects from readings from the RGB-D sensors 146. Based on requirements of missions and conditions of an environment, the objects of interest 180 are identified accordingly. In this embodiment where the method is carried out in a hospital, the objects of interest 180 may comprise doctors, nurses, person with crutches, person in wheelchairs, and person in beds.

At step 134, the semantic module 122 is configured to derive a semantic data for each identified object of interest 180 from the on-site reference features. The semantic data comprises semantic information that is of interest to the robot 100 in view of task and environment thereof. For example, for a task in hospital, semantic data of interest may comprise types of the objects of interest 180 (e.g. doctors, healthcare workers, person with disability, normal person etc.) and their respective poses (e.g. position and orientation with respect to the robot 100). The semantic module 122 receives information from the sensor module 102 comprising the 2D LiDAR sensors 142, the 3D LIDAR sensors 144, the depth (RGB-D) sensors 146, and the RGB sensor 148 and generates a semantic virtual force $F_D$ 150, a semantic point cloud $S_P$ 154, and a semantic factor S 156. The semantic module 122 uses an AI processing engine to make inference of the identified objects of interest 180 based on image data and the depth data captured by the sensor module 102. With the image data, a semantic object inference of the identified objects of interest 180 is made by performing semantic segmentation (object type/classification) on the image data. With the depth data, pose (position and orientation of object with respect to robot 100) of each object of interest 180 is obtained by performing pose segmentation on the depth data. Semantic factor S 156 is a predefined look up table composed based on user preference of object importance (e.g. a doctor is twice the influence of a normal person). For example, if an object of interest is detected to be a normal person, semantic factor S 156 is assigned a value of "1"; if an object is detected to be a nurse or a doctor, the semantic factor S 156 is assigned a value of "2"; if an object is detected to be a person with disability, the semantic factor S 156 is assigned a value of "3". As such, the robot 100 is able to offer more space and priority of way to a disabled person, compared to a normal person. The semantic point cloud $S_P$ 154 is a point cloud with a semantic label on each point based on the semantic object inference and the semantic factor S 156. The semantic virtual force $F_D$ 150 is calculated based on the pose (position and orientation with respect to robot 100) of each object of interest 180.

Figure 4:
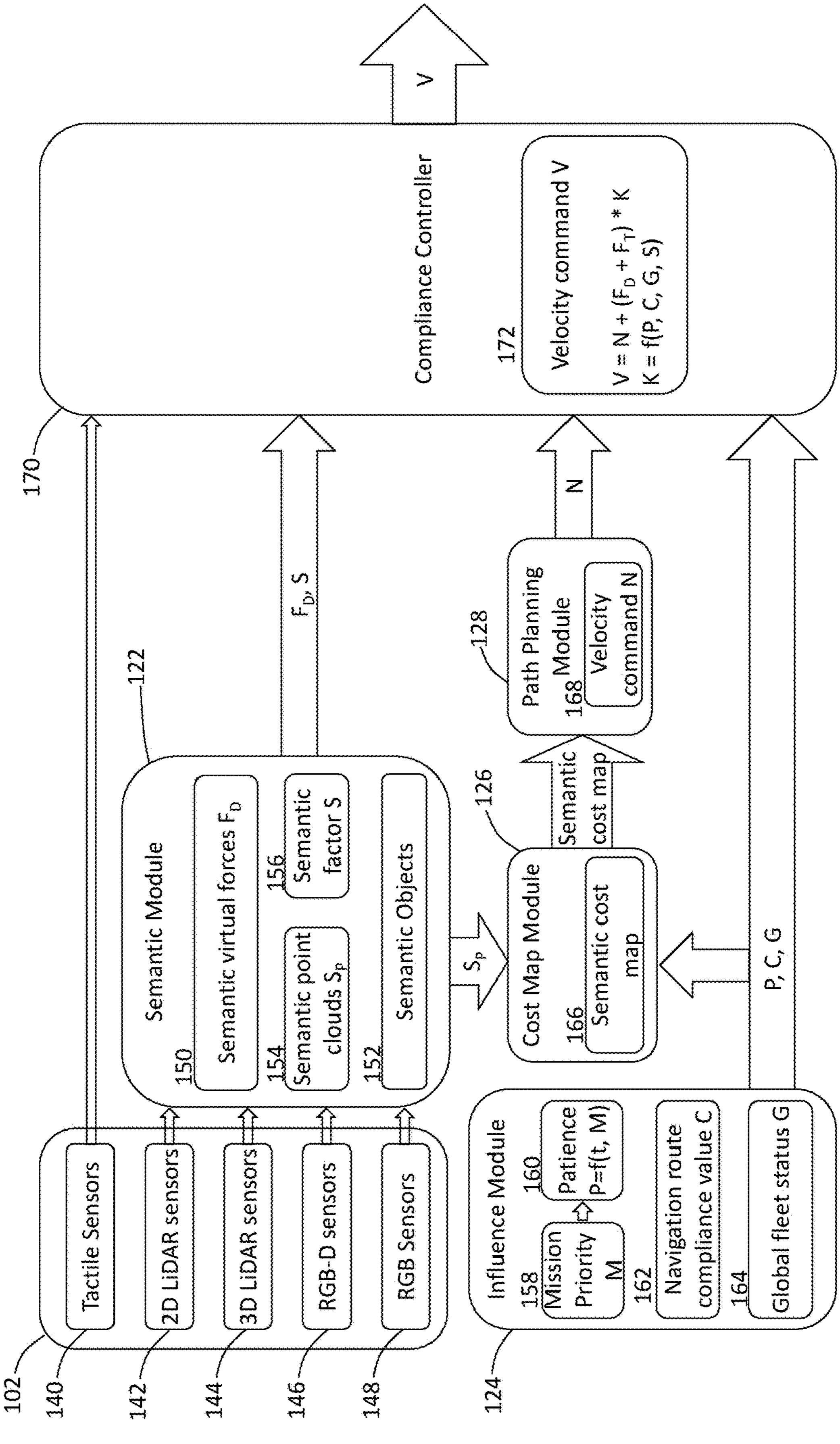
FIG. 4 illustrates a functional block diagram of the navigation system for performing the navigation method of FIG. 3.
Figure 5:
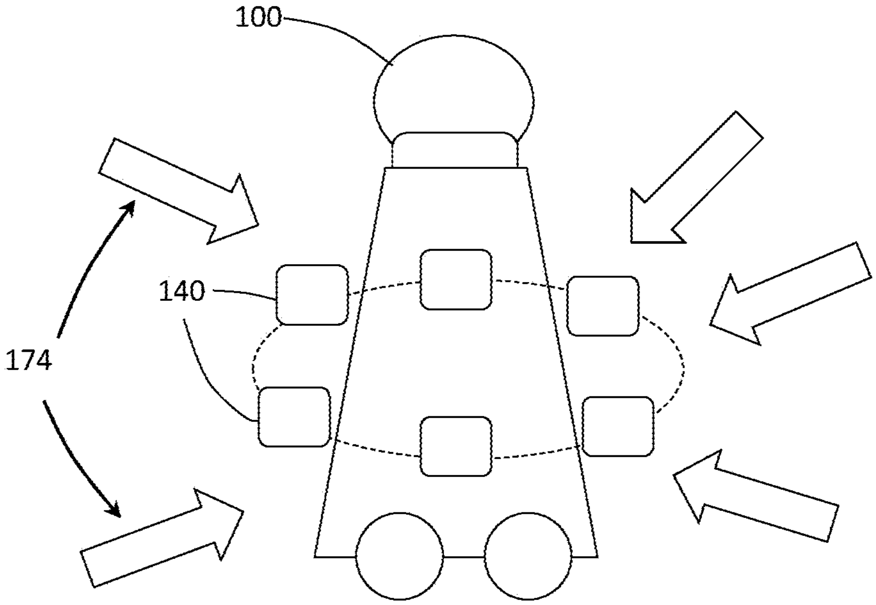
FIG. 5 illustrates an example of arrangement of sensors at the robot of FIG. 1.
Figure 6:
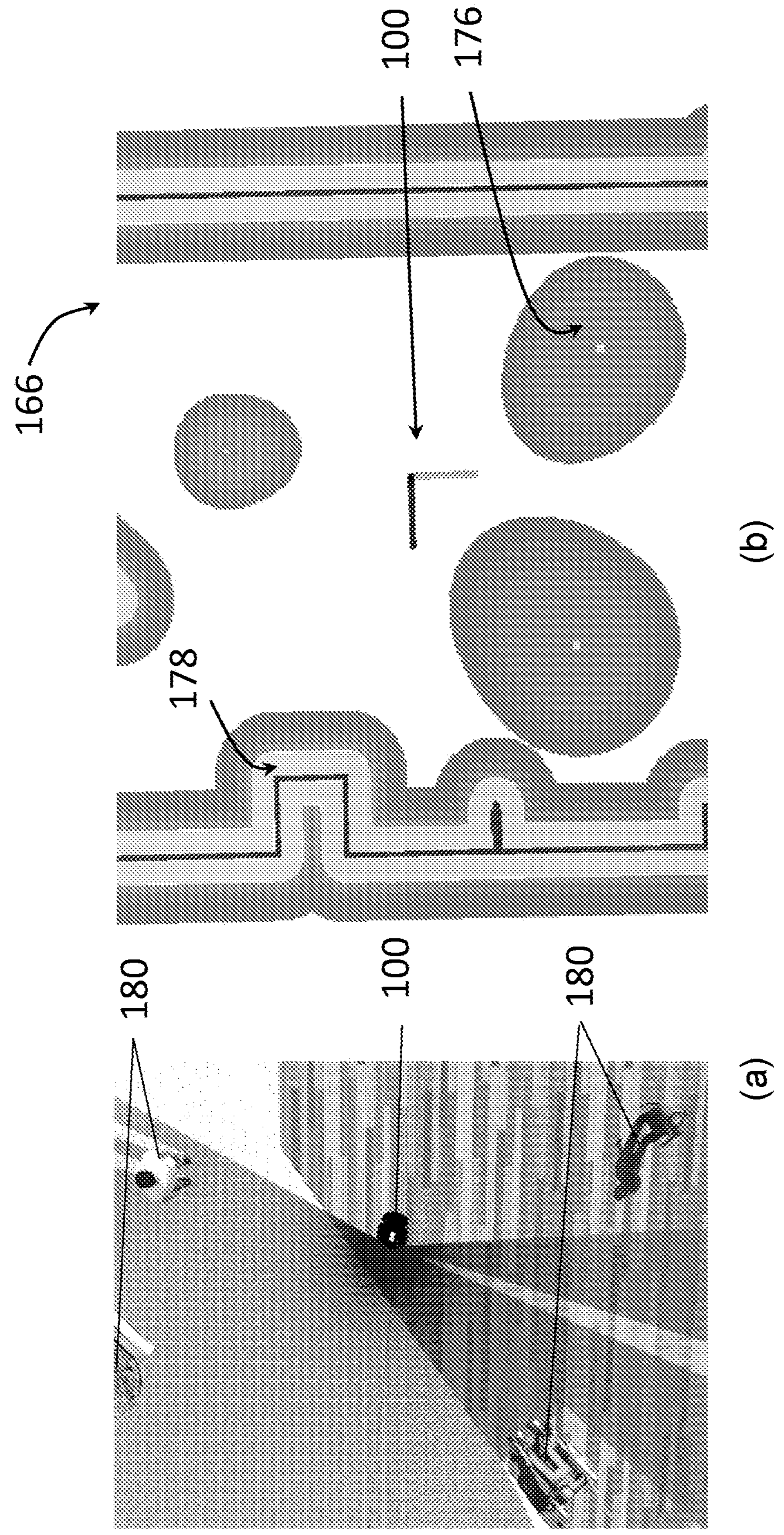
FIG. 6(*a*) illustrates the robot of FIG. 1 being surrounded by various objects.

At step 136, the cost map module 126 is configured to generate the semantic cost map 166 (see FIGS. 4 and 6(*b*)) based on the semantic data derived for the objects of interest 180. FIG. 6(*a*) illustrates the robot 100 being surrounded by various objects 180, including inanimate walls, a normal person, a nurse, and a person in wheelchair. FIG. 6(*b*) illustrates the semantic cost map 166 generated for FIG. 6(*a*), where each person has an ellipsoid shape inflation radius skewed in the orientation that such person faces. The cost map module 126 generates the semantic cost map 166 using a semantic cost map layer, which processes semantic data of the location that the robot 100 is traversing. For generating the semantic cost map 166, the cost map module 126 is arranged to receive information from the semantic module 122, including the semantic point clouds 154 and the objects of interest 180. Point cloud input from the semantic point clouds 154 is inflated according to ID of the respective object of interest 180, for generating the semantic cost map 166. Each object of interest 180 has an inflation radius (e.g. a low cost 176 and a high cost 178) in the semantic cost map 166, representing an area that may be blocked by the object of interest 180. The semantic data of each object of interest 180 is used to assess a risk level (i.e. difficulty level) of the object of interest 180. With the semantic factor S 156, the cost map module 126 is operable to calculate an inflation radius for each object of interest 180 which is proportional to risk level of the object of interest 180. The cost map 166 is further augmented using semantic information, which comprises Pose, Risk, Semantic factor S 156 etc. For a Pose of the object of interest 180, the area is inflated in the general shape of a Gaussian distributed ellipsoid that is skewed in the orientation that the object of interest 180 is facing. A Risk or Semantic factor S 156 of the object of interest 180 is used to determine the lethality of the inflation region. The areas of the objects of interest 180 assigned with high semantic factor are marked in the cost map 166 as more impassable, so that the robot 100 will plan a path around these objects of interest 180, accounting for the additional semantic information. Further, the inflation radius varies according to the classification of the corresponding object of interest 180. In this embodiment, a patient in a wheelchair or an elderly patient has a larger inflation radius than an abled person, so that the robot 100 will not get closer to the patient as compared to the abled person.

Preferably, the influence module 124 is configured to calculate the influence factor, and the cost map module 126 takes into consideration of the influence factor when generating the semantic cost map 166. As shown in FIG. 4, the calculation of the influence factor takes into consideration of a mission priority level M 158, a navigation route compliance value C 162 and a global fleet status G 164. The mission priority level M 158 is a value assigned by a user based on an importance of a task of the robot 100 (e.g., M for coffee delivery may be assigned a value of "1", while M for blood delivery may be assigned a higher value of "2"). The mission priority level M 158 is used as a basis to calculate a patience value P 160 to the robot 100. The mission priority level M 158 is a user assigned value based on an importance of the mission of the robot 100. The navigation route compliance value C 162 is an inherent value on each waypoint that is assigned based on a meta-knowledge of the environment and may be obtained from a user of the robot 100. When the robot 100 is navigating in a safe indoor environment, the navigation route compliance value C 162 may be higher (e.g. C=2), compared to when the robot 100 is navigating near a traffic road (e.g. C=1). This allows the robot 100 to be more flexible in giving way in indoor routes compared to outdoor routes, especially on streets near traffic road. The global fleet status G 164 comprises information of external condition of the robot 100 in the environment, such as whether the circumstance of the environment is normal or in heightened emergency. Specifically, for example, in an emergency situation in a hospital (e.g. fire alarm), it would be preferable for the robot 100 to have a relatively lower priority as compared to all other human individuals. There are various types of environments that the robot 100 works in, each type being associated with a level of emergency, which is determined based on function and nature of the environment, which is extracted from the metaknowledge of the environment.

Turning back to FIG. 3 at step 138, the navigation system navigates the robot 100 based on the semantic cost map 166. For the navigation, the path planning module 128 using existing robot path planning algorithm, plans a path based on the semantic cost map 166. The path plan comprises a velocity command N 168 for controlling an operation of the robot 100. Based on the path plan, the navigation system 104 navigates the robot 100 to traverse in the environment.

Figure 7:
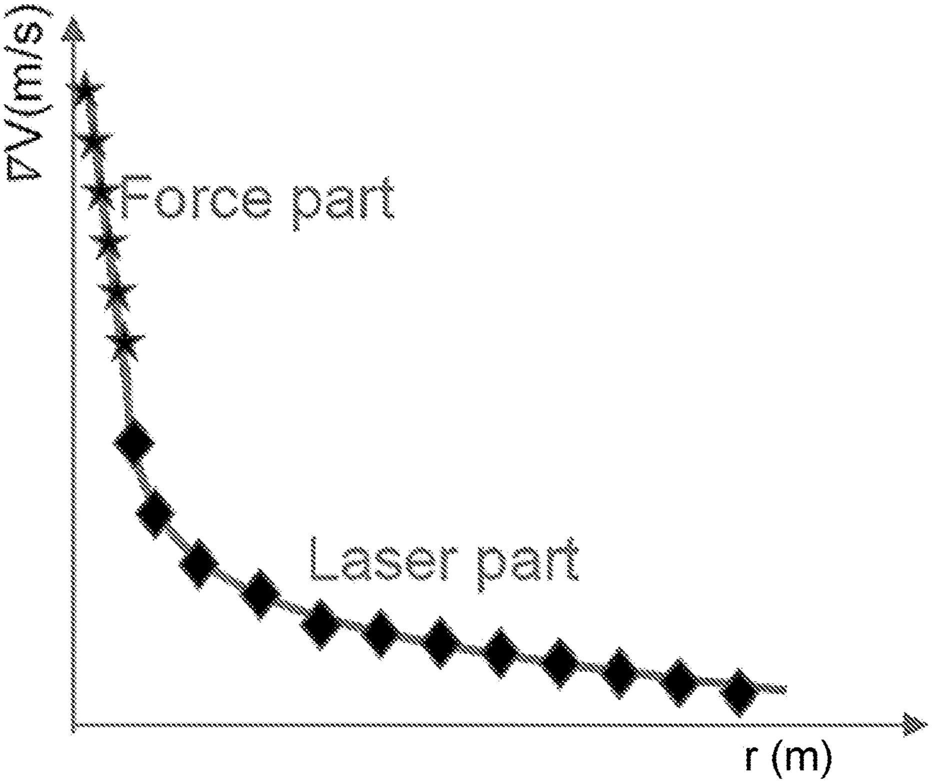
FIG. 7 is a graph illustrating the relationship between a summation of contact force and virtual force used in the method of FIG. 3 and a distance between the robot and an object of interest.
Figure 8:
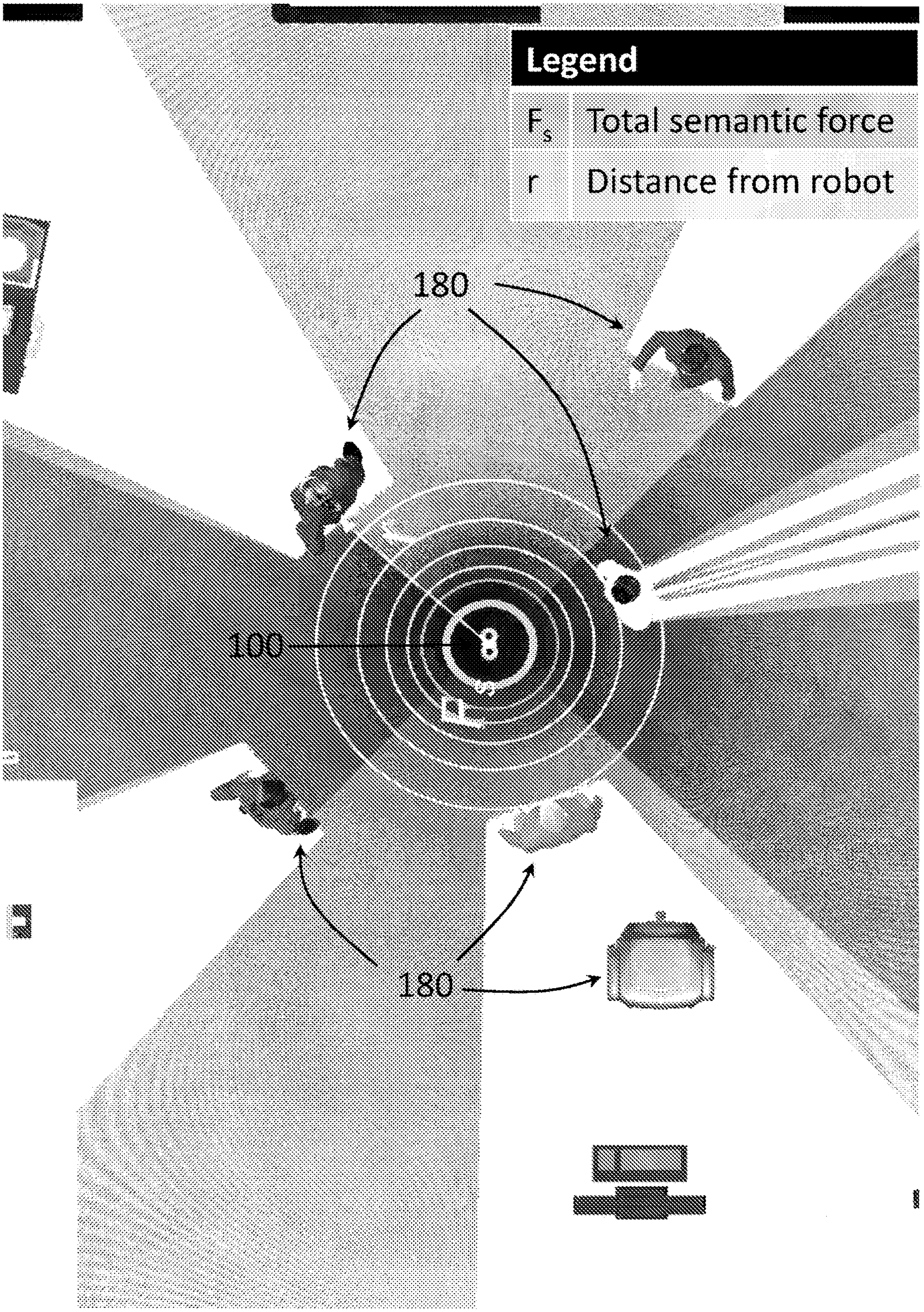
FIG. 8 illustrates a visual representation of the graph of FIG. 7.

While the robot 100 is traversing in the environment, the processor 108 and/or GPU 120 of the navigation system 104 working as the compliance controller 170 receives on-site detecting data or analysed/updated data from the sensor module 102, the semantic module 122, the influence module 124, the cost map module 126 and the path planning module 128, analyses the robot's compliance based on the received data, and provides instruction for regularizing the navigation of the robot 100 accordingly. The instruction for regularizing the navigation of the robot 100 comprises instruction for adjusting the velocity command of the path plan generated by the path planning module 128, updating the semantic cost map 166 etc. FIG. 8 illustrates a visual representation of the graph of FIG. 7, which shows that the robot 100 is scanning the environment in order to detect a distance (r) between the robot 100 and each object of interest 180. Each person in FIG. 8 has varying influence to the robot 100, according to their pose and semantic factor. A person which is closer, facing the robot, and classified as having high semantic factor (e.g. doctors) would have a higher semantic force in altering the robot navigation direction. A total semantic force $F_s$ calculated by the tactile sensor 140 is influenced by r. Each tactile sensor may have its own way of calculating the amount of pressure based on how deep the sensor is being pressed (i.e. there is a small change of r that is measured by the sensor) and the total semantic force $F_s$.

During navigation, the cost map module 126 outputs a semantic cost map 166 continuously, while taking inputs from semantic module 122 and the influence module 124. Where a new object of interest 180 is detected, the cost map module 126 updates the semantic cost map 166 based on the new object of interest 180. Where there is a change in the mission or the mission priority level M 158 of the robot 100, the cost map module 126 updates the semantic cost map 166 accordingly. Where an obstacle is detected, the cost map module 126 initially assigns a lethal cost to the obstacle which will be updated to a high cost if the robot 100 is unable to travel to goal after a certain period of time expires. Where the robot 100 enters an area with a higher level of emergency or the state of emergency is heightened (e.g. state of the hospital is heightened to code red), the cost map module 126 updates the semantic cost map 166 by increasing inflation radius of all objects of interest 180, which makes the robot 100 to be timid and to give priority to people evacuating. Where time used for a mission exceeds a threshold (e.g. when delivering blood and continuously being delayed by the surroundings), the influence module 124 reduces robot patience P and the cost map module 126 updates the semantic cost map 166 for the path planning module 128 to re-plan with less timid, and the robot 100 will then be configured to signal more sound alarms.

FIG. 4 illustrates a functional block diagram of the navigation system 104 for implementing the navigation method based on data readings from the sensor module 102. The 2D LiDAR sensors 142, the 3D LiDAR sensors 144, the depth (RGB-D) sensors 146, and the RGB sensors 148 of the sensor module 102 detect on-site reference features while the robot 100 is traversing in an environment, the readings are then sent to the semantic module 122. The semantic module 122 identifies the objects of interest 180 from the sensor readings and derives a semantic data for each object of interest 180, to generate the semantic objects 152 by associating the semantic data to corresponding object of interest 180. Based on the semantic objects 152 and point cloud sensor readings from the sensor module 102, the semantic module 122 generates the semantic point clouds $S_P$ 154, which will be subsequently used for assigning the semantic factor S 156. The combination of 2D LiDAR sensors 142, 3D LiDAR sensors 144, RGB-D sensors 146, and RGB Sensors 148 of the sensor module 102 scans and outputs the semantic virtual forces $F_D$ 150. In this embodiment, the semantic module 122 is configured to provide data to other modules, such as sending the semantic virtual forces $F_D$ 150 and the semantic factor S 156 to the compliance controller 170, and sending the semantic point clouds $S_P$ 154 to the cost map module 126, etc.

Separately, the influence module 124 receives the mission priority M 158, the navigation route compliance value C 162, and the global fleet status G 164, for calculating external influence factors. Based on the value of the mission priority M 158, the influence module 124 generates the patience value P 160, using formula P=f(t, M), wherein the patience value P is based on a countdown timer, where the starting time of the timer are assigned based on mission priority M, and decreases over time. The value of M corresponds to an assigned value decided by the user (e.g. as a reference, for blood delivery with a mission priority M at a value of 2, the timer begins at 2 minutes; whereas for coffee delivery with a mission priority M at a value of 5, the timer begins at 5 minutes. In this embodiment, the influence module 124 is configured to provide data to other modules, such as sending the patience value P 160, the navigation route compliance value C 162 and the compliance of the global fleet status G 164 to the cost map module 126 and the compliance controller 170.

The cost map module 126 receives the semantic point clouds $S_P$ 154 from the semantic module 122, and the patience value P 160, the navigation route compliance value C 162 and the global fleet status G 164 from the influence module 124 and generates the semantic cost map 166. Thereafter, the cost map module 126 provides the semantic cost map 166 to the path planning module 128.

Based on the semantic cost map 166, the path planning module 128 generates a path plan, including the velocity command N 168, for controlling and navigating the robot 100. The path planning module 128 provides the velocity command N 168 to the compliance controller 170. For deriving the velocity command N, the path planning module 128, in this embodiment, takes 3 inputs for the calculation: the semantic cost map 166 from the cost map module 126 acting as a "local cost map", a "global map" of the environment, and a navigation goal coordinate in the global map given by the user. The creation of the global map and the calculation of the velocity command N may be performed based on established autonomous navigation methodology.

While the robot 100 is traversing based on the path plan, the compliance controller 170 calculates the output velocity V, based on command velocity N 168 for controlling and navigating the robot 100, based on readings from the tactile sensors 140, the semantic virtual forces $F_D$ 150 and the semantic factor S 156 from the semantic module 122, the velocity command N 168 from the path planning module 128, and the patience value P 160, the navigation route compliance value C 162 and the compliance of the global fleet status G 164 from the influence module 124. Specifically, in response to a physical contact between the robot 100 and any object being detected the compliance controller 170 temporarily adjusts the velocity command N 168 to a velocity command V 172 using Equation (1) as below, until predetermined period expires.

$$V = N + (F_D + F_T) * K = N + \left( \sum_{i=0}^{N_l} \frac{K_o}{K_l r} + \sum_{i=0}^{N_f} K_s F_s \right) * \mathcal{F}(P, C, G, S) \tag{1}$$

wherein, $F_D$ represents the semantic virtual forces $F_D$ 150 induced by Lidar, Sonar or any other non-contact range sensors; $F_T$ represents readings from force or tactile sensors 140; K represents an overall influence factor which is a function of the patience value P 160, the navigation route compliance value C 162, the global fleet status G and the semantic factor S 156, i.e., $\mathcal{F}$ (P, C, G, S), being a customized function to define the logic behind the compliance control considering various information and is calculated using Equation (2):

$$\mathcal{F}(P, C, G, S) = \min(C, S, \max(K_P P, G)) \tag{2}$$

wherein, $N_l$ represents a total number of sensor data for the semantic virtual force $F_D$ 150; $N_f$ represents a total number of non-zero physical forces instances from robot tactile sensors 140; $K_l$, $K_s$, and $K_p$ are weight constants for normalization of r, $F_s$ and P, respectively; r represents a distance between each of objects of interest 180 and the robot 100; $F_s$ represents the total semantic force acting on the robot 100 being calculated from data obtained by the tactile sensors 140; $K_o$ is calculated based on object orientation relative to the robot 100, using Equation (3):

$$K_o = 1 + K_N + \vec{a}_{norm} \cdot \vec{b}_{norm} \tag{3}$$

wherein, $K_N$ is a weight constant, $\vec{a}_{norm} \cdot \vec{b}_{norm}$ is a vector dot product between a vector of pose of an object of interest 180 and a vector from a position of the object of interest 180 to a position of the robot 100.

As discussed above, Equation (1) comprises a summation, $$\sum_{i=0}^{N_l} \frac{K_o}{K_l r} + \sum_{i=0}^{N_f} K_s F_s,$$

which calculates a summation of influences from semantic forces and external factors.

$$\sum_{i=0}^{N_l} \frac{K_o}{K_l r}$$

represents virtual force (laser part), while $$\sum_{i=0}^{N_f} K_s F_s$$

represents contact force (force part). FIG. 7 is a graph illustrating the relation between the summation (illustrated as ∇V) and distance r between the robot 100 and an object of interest 180. As shown in FIG. 7, in general, when an object of interest 180 is in physical contact with the robot 100 (e.g. the segment of the line chart labelled with stars in FIG. 7), contact force (force part) is designed to have higher influence than virtual force (laser part) in Equation (1); when the object of interest 180 is not in physical contact with the robot 100 (e.g. the segment of the line chart labelled with diamonds in FIG. 7) the contact force (force part) in Equation (1) is zero. On the other hand, the virtual force (laser part) will decrease as distance r increases. Hence, the line chart in FIG. 7 also shows that summation ∇V decreases while the distance r increases.

FIG. 8 illustrates a visual representation of the graph of FIG. 7. The concentric circles in FIG. 8 is a set representation of levels of influence based on the variable, distance r, alone. Consistent to that shown in FIG. 7 graph, the further the circles from the robot 100, the weaker the influence force.

In addition, the path planning module 128 has a re-planning function and predetermines conditions that trigger the re-planning function. Re-planning of path plan relieves the robot 100 from being stuck in local minima. A repulsive manoeuvre detected by the sensor module 102 is one condition that triggers the re-planning of the path plan. If the robot 100 has no path to progress, the path plan may be replanned. Using Equation (1), the tactile sensors 140, the 2D LiDAR sensors 142, the 3D LiDAR sensors 144, the RGB-D sensors 146 and the RGB sensors 148 are integrated together inside the compliance controller 170 to provide input for the outcome of the navigation with compliance action, and tackle the condition of making physical contact with any object by avoiding severe collision.

In addition to the passive social interactions of avoiding collision, the robot 100 in this example utilizes the tactile sensor 140 to engage actively with the human subject in the near vicinity and makes social interactions with the human subject. The social interactions include turning to the direction of the human subject that has made physical contact with the robot 100, identifying the human subject and assigning a cost to the human subject in the semantic cost map 166. The ability to make active social interactions with human subject enables the robot 100 to adjust its own pose accordingly to enlarge its perception view efficiently, especially when range sensors have limited view. The ability to make active social interactions with human subject also enables the robot 100 to respond to human subjects' request of being assigned a special cost during path planning.

In this example, the scenarios of the robot's navigation are categorised into four classes, simulating to human character:

- Character "Polite": Polite is a scenario for situations where the robot 100 is performing daily operation missions with a fixed mission route and in an area that is not crowded. Polite is the most compliant state of the robot 100 which may be used for scenario where the mission is not urgent. Under the Polite scenario, the robot 100 is patient and complies with basic social norms (such as keeping to the left, give way if come across with a human subject, etc.).
- Character "Speed-up": Speed-up is a scenario for situations where the urgency of mission is at a higher level than that of the Polite scenario. Under the Speed-up scenario, the path planning module 128 operates at an agile mode so that overtaking is taken into consideration more than in the Polite scenario.
- Character "Socially-aware": Socially-aware is a scenario for situations where the navigation of the robot 100 is carried out in a semi/dense crowded condition. Under Socially-aware scenario, the robot 100 tracks pedestrians' trajectories and predicts the pedestrians' intention, which facilitate the robot 100 in understanding the crowd (e.g. flow of human subjects). Under Socially-aware scenario, the robot 100 engages with human subjects in near vicinity in the forms of both passive social interaction and active social interaction.
- Character "Aggressive": Aggressive is a scenario for situations where the robot 100 is performing an urgent mission in crowd. Under Aggressive scenario, the robot uses available infrastructure mounted on the robot 100 to warn the surrounding people, e.g. enables alarm and horns at right direction.

For determining which scenario applies to a current situation, thresholds are set for different parameters, including the mission priority level M 158 and level of crowdedness. In this embodiment, the mission priority level M 158 is categorised into routine, enhanced, mid-urgent and urgent; while the level of crowdedness is categorised as not crowded, semi-crowded and crowded. When the mission priority level M 158 reaches urgent and the level of crowdedness reaches crowd, then the robot works under the Aggressive scenario.

As shown above, the proposed method and system make use of multi-modal proprioception inputs, multiple external influence factors, and an AI module to provide input for robot navigation, which demonstrates various advantages.

Specifically, by detecting the objects of interest 180 and deriving semantic data for corresponding objects of interest 180, the semantic cost map 166 generated based on such semantic data may comprise different costs for different groups of objects of interest 180, which may help to improve the efficiency of path planning and therefore improve the navigation, particularly when the robot is in a crowded environment.

The influence factor may be used to tackle a situation when the robot is unable to proceed on its task, whereby the robot is "trapped", due to being surrounded by objects of high semantic factor. The influence module may dynamically alter the effect of the semantic factor through Patience factor P, which decrease over time. This may allow the robot to attempt to "squeeze" through these objects.

The use of contact sensors with non-contact or range sensors may help to enlarge robot's perception range. Specifically, by integrating force/touch input with the semantic data, it may provide the robot 100 social clues for more natural human-robot interaction, and the robot 100 may be able to engage with human subjects in its near vicinity both passively and actively: for a passive social interaction of avoiding severe collision, the compliance navigation implemented based on artificial potential fields considering not only laser scan but also force reading from the tactile sensors 140 may enable the robot 100 to be capable of responding to any possible collision in a fast and reliable manner; for actively social interaction, the robot 100 may turn to the direction of the human subject when touched by the human subject, identify and assign costs accordingly for motion planning. This may help to make the robot 100 smarter, such as it may enable the robot 100 to give priority to more important objects of interest 180 such as people on wheelchair, people pushing large objects, etc., by classifying human subject features (vulnerable, disable, etc.), it may enable the robot 100 to avoid moving against the flow of pedestrians taking into consideration of social constraints and respect personal space, and it may also enable the robot 100 to move about dynamic crowded scenes with predictive, social, and context awareness of its environment by adjusting potential field size for different object classes, and path planning under dynamic potential field.

With the above described method and system, if the robot 100 hits something, the robot 100 may not just stop or reverse and retry its route again, as the robot 100 may use the force magnitude or direction information to make adjustment on navigation.

Therefore, the above described method and system may enable the robot 100 to adapt to dynamic situations, operate in crowded human-dense environments (including sharing its operation space) and behave with socially acceptable reactions, which realizes a compliance navigation with an adaptive/dynamic spectrum of robot behaviour based on circumstances and space available.

While the flow chart of FIG. 3 shows an order of steps of the method of navigating the robot 100, it is envisaged that the order of steps may be altered, for example, at a location where existing semantic information is available, the step of generating the semantic cost map 166 (step 136) may be carried out before the step of deriving the semantic data from the on-site reference feature (step 134). After the semantic cost map 166 is generated (step 136), the step of deriving the semantic data from the on-site reference feature (step 134) may still be carried out and the semantic data may be used to update the semantic cost map 166.

While in the described embodiment, the cost map module 126 takes into consideration of information from both the semantic module 122 and the influence module 124 in generating the semantic cost map 166, it is envisaged that the cost map module 126 may generate the semantic cost map 166 based on information from the semantic module 122 without information from the influence module 124.

While the semantic module 122 uses an AI processing engine in the described embodiment, it is envisaged that the semantic module 122 may use other methods or tools for obtaining the semantic data.

While it is mentioned in the described embodiment that the robot 100 has wheels, it is envisaged that the robot 100 may be of any type that is able to move around, such as a robot equipped with legs, wings, propellers and/or balloon. It is also envisaged that one type of the robot 100 equipped with wheels is an autonomous vehicle (AV).

While FIG. 5 in the described embodiment shows six locations for mounting the tactile sensors 140, it is envisaged that FIG. 5 is for exemplary purpose only and there may be other number of the tactile sensors 140 and other locations for mounting the tactile sensors 140. Further, it is envisaged that there is no limit to the types of sensors to be used in one embodiment, as long as the sensor module 102 is able to detect sufficient information of the environment for navigating the robot 100.

While in the described embodiment, the incoming force or touch is indicated to be from a person, it is envisaged that the force or touch may also come from a non-human object, e.g. when the robot 100 hit an object. And it is envisaged that the robot 100 may take the readings of different sensors for inferring the nature of the object.

While in the described embodiment, the combination of 2D LiDAR sensors 142, 3D LIDAR sensors 144, RGB-D sensors 146, and RGB Sensors 148 of the sensor module 102 scans and outputs the semantic virtual forces $F_D$ 150, it is envisaged that different combination of sensors may be used, including sensors not mentioned above.

While in the described embodiment, the objects of interest 180 are detected using image segmentation from readings from the RGB-D sensors 146, it is envisaged that other data and/or other methods may be used for such detection, such as object detection based on a combination of RGB data (camera), RGB-D data (camera and point cloud) and point cloud (2D LiDar and 3D LiDAR).

While in the described embodiment, the system comprises different modules, such as the semantic module 122, the influence module 124 and the cost map module 126, it is envisaged that it is not necessary to always have the same number of modules, as one module may be configured to perform more than one task; for example, one module may be configured to perform semantic analysis so that it may be treated as the semantic module 122 on the one hand, and in the meantime such module may also be configured to perform influence analysis so that it may be treated as the influence module 124 on the other hand.

Similarly, while in the descried embodiment, the controller 108 of the navigation system 104 and the controller 106 of the robot 100 appear to be two separate modules, it is envisaged that the controller 108 and the controller 106 may be the same processor.

While in the described embodiment, the controller 108 of the navigation system identifies the objects of interest 180 from the detected on-site reference features, it is envisaged that such method may be performed by other modules, such as the controller 106, or where available a processor in the sensor module 102 etc.

While in the described embodiment, the objects of interest 180 comprise doctors, nurses, person with crutches, person in wheelchairs, and person in beds, it is envisaged that at different occasion, such as a bank or a mall, the objects of interest 180 may comprise different groups of person.

While some scenarios are listed in the described embodiment on triggering update of the semantic cost map 166, it is envisaged that such list is not exhaustive and there may be other scenarios for which the update may be triggered.

Having now described the invention, it should be apparent to one of ordinary skill in the art that many modifications can be made hereto without departing from the scope as claimed.

The invention claimed is:

1. A method for navigating a robot, the robot comprising a controller configured to control movement of the robot, a sensor module configured to detect on-site reference features and a processor, comprising:

detecting, by the sensor module, on-site reference features of the robot's location when the robot is traversing in an environment;

identifying, by the processor, objects of interest from the detected on-site reference features; wherein identifying the objects of interest includes identifying, by the processor, a motion status of each identified object of interest;

deriving, by the processor, a semantic data for each object of interest from the on-site reference features; wherein deriving the semantic data includes predicting, by the processor, a trajectory of the object of interest that is identified to be in motion;

generating, by the processor, a semantic cost map representing cost of traversing in the environment based on the semantic data of the objects of interest, wherein the semantic cost map comprises an inflation radius calculated for each identified object of interest proportional to a risk level of the corresponding identified object of interest, the inflation radius calculated for each identified object of interest is variable; and controlling, by the processor, the controller to cause movement of the robot to navigate the environment based on the semantic cost map.

2. The method according to claim 1, wherein navigating the robot based on the semantic cost map comprises deriving, by the processor, a velocity command from the semantic cost map comprising the inflation radius calculated for each identified object of interest for controlling the robot.

3. The method according to claim 1, wherein detecting the on-site reference features comprises detecting, by the sensor module, a tactile force being applied to the robot.

4. The method according to claim 1, wherein the semantic data for each object of interest is derived from at least one of a predefined importance value of a type of a corresponding object of interest, a position of the corresponding object of interest, an orientation of the corresponding object of interest with respect to the robot, and a classification of the corresponding object of interest.

5. The method according to claim 1, further comprising analysing, by the processor, a priority level of a mission of the robot, a navigation route compliance value in the environment, and a condition of the environment, for updating the semantic cost map, wherein updating the semantic cost map comprises adjusting inflation radius of all identified objects of interest.

6. The method according to claim 1, wherein detecting the on-site reference features at the robot's location comprises obtaining, by the sensor module, a vision data at the robot's location.

7. The method according to claim 6, wherein deriving the semantic data for each object of interest comprises performing, by the processor, a semantic segmentation on the vision data.

8. The method according to claim 1, wherein:

detecting the on-site reference features comprises detecting, by the sensor module, a tactile force being applied to the robot; and navigating the robot based on the semantic cost map comprises deriving, by the processor, a velocity command from the semantic cost map comprising the inflation radius calculated for each identified object of interest for controlling the robot;

the method further comprises, in response to the detection of the tactile force being applied to the robot, adjusting, by the processor, the velocity command.

9. A system for navigating a robot, comprising:

i. a sensor module, configured to detect on-site reference features;

ii. a controller, configured to control movement of the robot; and iii. a processor, configured to:

receive on-site reference features detected at the robot's location when the robot is traversing in an environment;

identify objects of interest from the on-site reference features and a motion status of each identified object of interest;

derive a semantic data for each object of interest from the on-site reference features and predict a trajectory of the object of interest that is identified to be in motion;

generate a semantic cost map representing cost of traversing in the environment based on the semantic data of the objects of interest, wherein the semantic cost map comprises an inflation radius calculated for each identified object of interest proportional to a risk level of the corresponding identified object of interest, the inflation radius calculated for each identified object of interest is variable; and control the controller to cause movement of the robot to navigate the environment based on the semantic cost map.

10. The system according to claim 9, the processor is further configured to derive a velocity command from the semantic cost map comprising the inflation radius calculated for each identified object of interest for navigating the robot.

11. The system according to claim 9, wherein the on-site reference features comprise a tactile force being applied to the robot.

12. The system according to claim 9, wherein the semantic data for each object of interest is derived from at least one of a predefined importance value of a type of the corresponding object of interest, a position of the corresponding object of interest, an orientation of the corresponding object of interest with respect to the robot, and a classification of the corresponding object of interest.

13. The system according to claim 9, the on-site reference features of the robot's location comprises a vision data at the robot's location.

14. The system according to claim 13, the processor is further configured to perform a semantic segmentation on the vision data for deriving the semantic data.

15. The system according to claim 9, the processor is further configured to:

receive a tactile force being applied to the robot;

derive a velocity command from the semantic cost map comprising the inflation radius calculated for each identified object of interest for navigating the robot; and in response to the receipt of the tactile force being applied to the robot, adjust the velocity command.

16. A robot, comprising:

a system according to claim 9.

17. The system according to claim 9, wherein the processor is further configured to analyse a priority level of a mission of the robot, a navigation route compliance value in the environment, and a condition of the environment, for updating the semantic cost map, and the processor is further configured to update the semantic cost map by adjusting inflation radius of all identified objects of interest.

* * * * *